Inventors
Howard W. Hartman
James Fearon Brown,

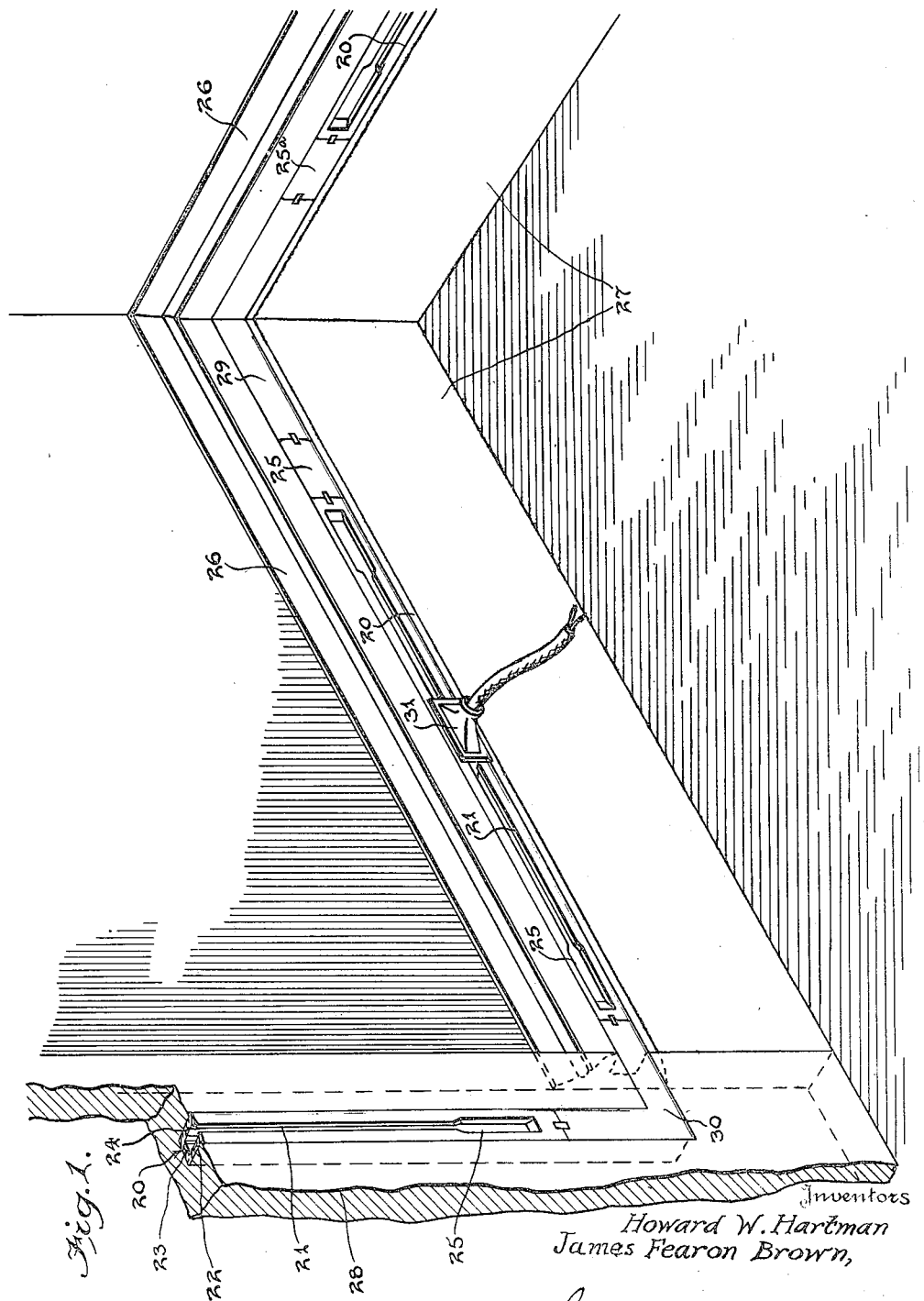

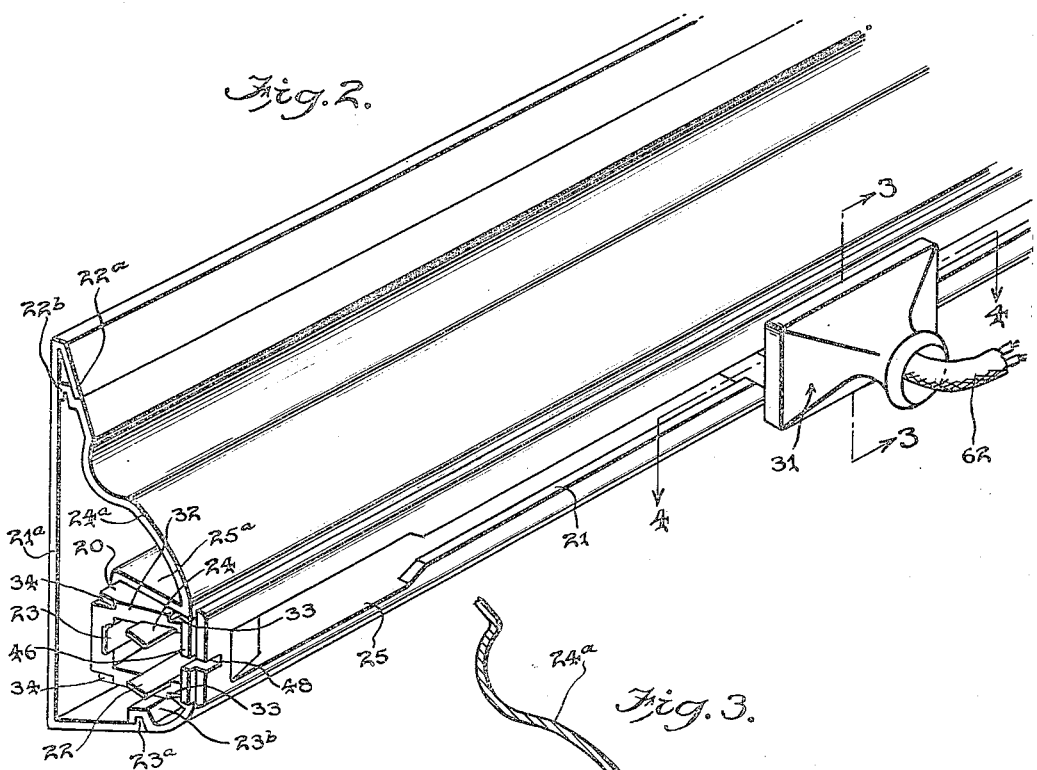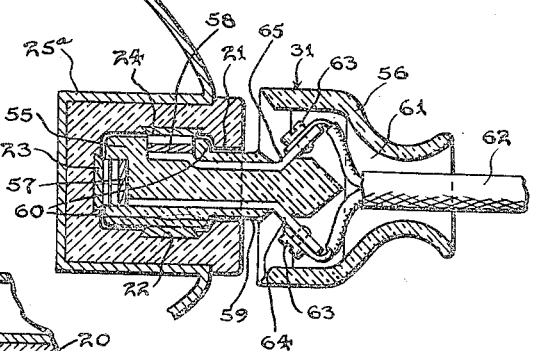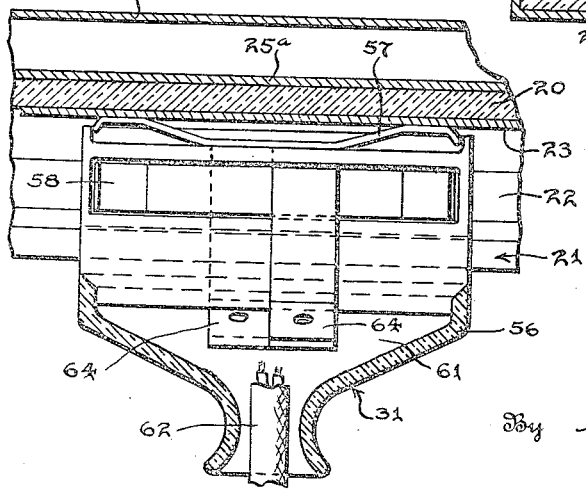

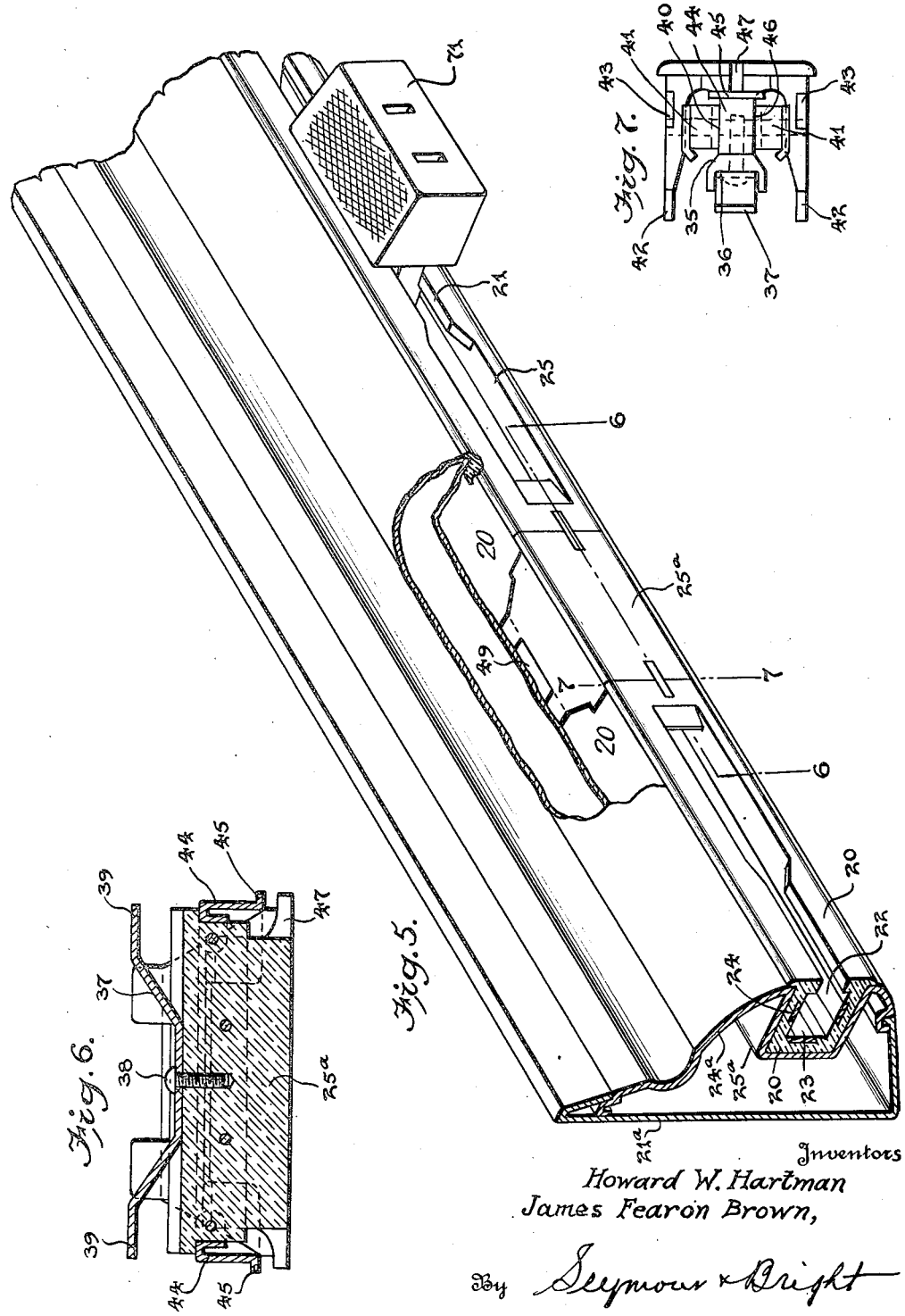

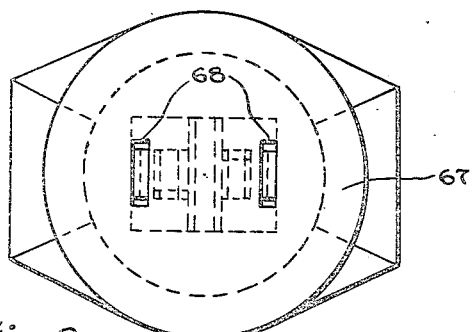
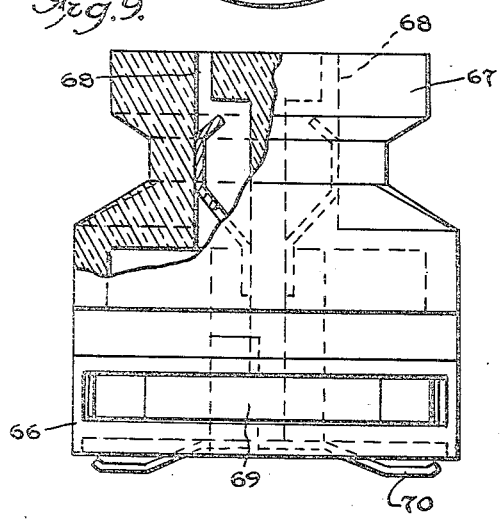
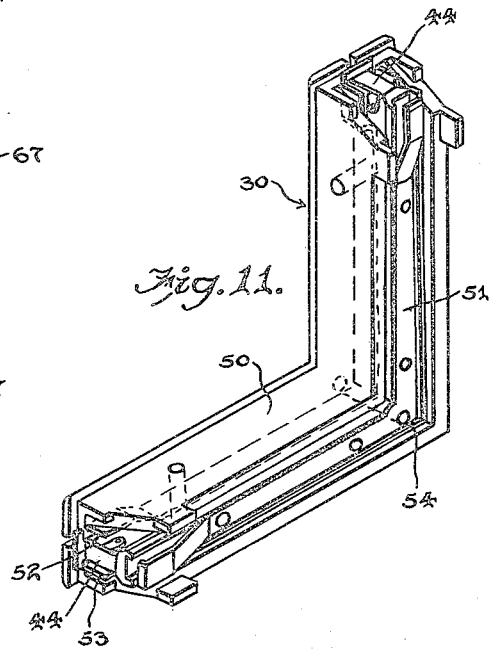
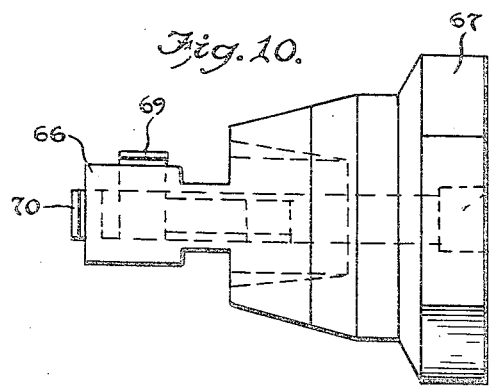
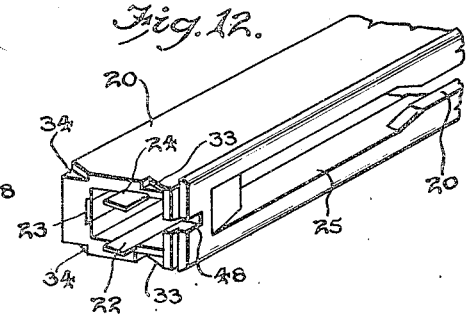
Inventors
Howard W. Hartman
James Fearon Brown, April 13, 1937.   H. W. HARTMAN ET AL   2,076,558
ELECTRICAL CONDUIT SYSTEM
Filed Aug. 22, 1933   7 Sheets-Sheet 6

By Seymour & Bright
Attorneys

April 13, 1937.   H. W. HARTMAN ET AL   2,076,558
ELECTRICAL CONDUIT SYSTEM
Filed Aug. 22, 1933   7 Sheets-Sheet 7

Inventors
Howard W. Hartman
James Fearon Brown,

By Seymour & Bright
Attorneys

Patented Apr. 13, 1937

2,076,558

UNITED STATES PATENT OFFICE 2,076,558

ELECTRICAL CONDUIT SYSTEM

Howard W. Hartman, South Williamsport, and James Fearon Brown, Williamsport, Pa.; said Brown assignor to said Hartman Application August 22, 1933, Serial No. 686,294

9 Claims. (Cl. 247—3)

This invention relates to improvements in electrical conduit systems and means of distribution of electrical energy, and more specifically to the means of access and convenience of outlet service from the line terminal to the device or devices utilizing electric current.

One of the objects of the invention is to provide a system of distribution permitting installation with a minimum of field work and to supply means allowing the insertion or attachment of various connectors, jack plugs, receptacles or the like which may be readily hooked up to the electric circuit or circuits and which may be moved to any desired location. This eliminates the necessity of installation of added outlet boxes and receptacles with attendant inconvenience and expense.

Another object is to furnish means to permit the running of various circuits parallel with and adjacent to the system, the whole forming a compact unitary construction.

A further object is to provide means for running various circuits parallel with and adjacent to this system in methods known as surface, concealed, or a novel combination of both.

A still further object is to supply metal trim in which circuits may be concealed, such trim being made up mainly of standard metal stampings, so as to permit of various arrangements to accommodate baseboards, panels, wainscots, etc.

With the foregoing objects outlined and with other objects in view which will appear as the description proceeds, the invention consists in the novel features hereinafter described in detail, illustrated in the accompanying drawings and more particularly pointed out in the appended claims.

In the drawings:

Fig. 1 is a perspective view of the corner of a room and showing our improved system applied.

Fig. 2 is a fragmentary perspective view of the collector device and the opened end of the metal molding and conductor unit.

Fig. 3 is a vertical sectional view of a detail taken on the line 3—3 of Fig. 2.

Fig. 4 is a horizontal sectional view partly broken away and taken on the line 4—4 of Fig. 2.

Fig. 5 is a perspective view of a form of the system partly broken away and showing a connector unit in relation to the conductor units and the preferred form of an adaptor.

Fig. 6 is a horizontal sectional view of the connector unit taken on the line 6—6 of Fig. 5.

Fig. 7 is an end view of the connector unit,

Fig. 8 is a front elevation of one form of the adaptor.

Fig. 9 is a plan view of the same partly in section.

Fig. 10 is an end view of this form of the adaptor.

Fig. 11 is a perspective view of one of the angular connector units and shown from the inner side thereof.

Fig. 12 is a fragmentary perspective view of one end of a conductor unit.

Figure 13:
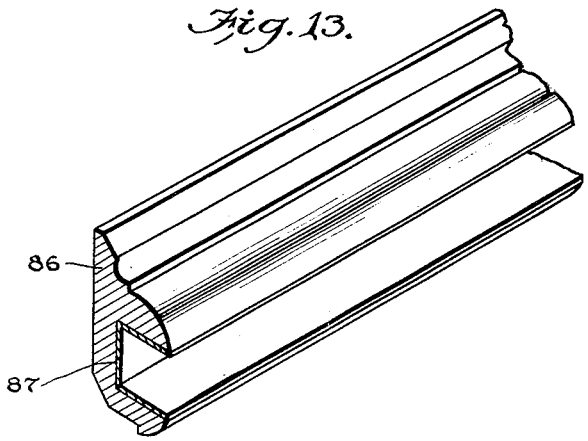
Fig. 13 is a fragmentary perspective view showing a metal channel in a wood molding or trim arranged for the conduit system.

In the embodiment of the invention illustrated in Figs. 1 to 14 inclusive, 20 designates a tube of insulating material having a face slot 21 and internal conductors 22, 23 and 24, and the whole forms a conductor unit to which various electrical units may be connected by inserting a portion of the same through an enlargement 25 of the slot 21.

Obviously such a conductor unit may be placed at any suitable location within a room. For example in Fig. 1, horizontal portions of the same are shown arranged in molding strips 26 at the top of baseboards 27. Another conductor unit is shown in the figure as embedded in a door frame 28 or the like.

Horizontal conductors may be electrically connected at a corner of a room, for example, by means of a horizontal angular connector 29 and a vertical conductor unit can be connected to a horizontal unit by a vertical angular connector 30, and these connectors 29 and 30 will be more fully described hereinafter. A collector plug 31 or the like can be introduced into any one of the slots 21 through the enlargement 25 of the latter and may be shifted along the slot in the manner of a trolley to furnish current to any desired device which will utilize the same.

As shown in Fig. 2 the conductor unit may be placed in a metal molding consisting of a rear channel 21a having portions 22a and 23a designed to interlock with portions 22b and 23b of a confronting or faced plate 24a when the latter is flexed and snapped into engagement with the extremities of the channel 21a. Obviously this arrangement will hold the face plate in position until it is intentionally removed. A channel 25a in the face plate permits the insertion of one or more of the conductor units 20, and if more than one unit is used and they are arranged end to end, suitable means are provided for electrically connecting the conductors 22, 23 and 24 of the two units. These two units may be electrically connected by a connector unit 25a of the type shown in Figs. 5, 6 and 7.

It will be noted from Fig. 2 that each end of a conductor unit has the extremities of the conductors projecting from the insulation tube and it may also be seen that the extremity of the tube as shown at 32 is arranged at an angle tangent to the length of the tube and provided with upper and lower front and rear recesses 33 and 34. This configuration of the ends of the conductor unit enables a connector unit 25a having ends complementary thereto to be readily inserted into the channel between adjacent conductor units and to be brought into abutting relation therewith.

As illustrated in Figs. 5, 6 and 7 the connector unit 25a is formed of a block of insulating material of substantially W-shape when viewed from one end. The central leg 35 of the unit has its extremity grooved as at 36 to receive a resilient conductor strip 37 which may be secured to the block by any suitable means such as a screw 38 which extends through the central portion of the strip. As the ends of the strip are offset rearwardly relatively to the medial portion of the same, they provide shoes 39 which can bridge the gap between two of the conductors 23 and place those conductors in conducting relationship. The opposite sides of the central portion of the conductor block are recessed as shown at 40 for the connection of conductor strips 40 and 41, which are similar to the strip 37 and function to bridge the gap respectively between adjacent conductors 24 and 22 of a pair of conductor units.

Lugs 42 and 43 which project from the top and bottom legs of the connector block enter respectively the recesses 34 and 33 of adjacent conductor units.

In order to removably hold a connector unit in place, it is provided at its ends with spring metal latches 44, each of which is connected to an end of the block by any suitable means and provided at its other end with an outwardly projecting flange 45. These flanges at opposite ends of the block are adapted to enter the ends of adjacent tubes 20 and to abut the rear surfaces 46 of the front wall of the tubes. In order that the latches may be readily manipulated, the ends of the connector unit as well as the ends of the conductor units are provided respectively with aligned notches 47 and 48 to permit the insertion of a suitable tool when a conductor unit is to be installed or removed.

In view of the fact that the conductor strips 37 and 41 are all of substantially V-shape, it will be understood that when a connector unit is introduced into the channel between the ends of two conductor units, the ends of the connector strips will contact with conductors of said units similarly to the action of a knife blade switch and will be pressed toward the insulation block which carries the same. Consequently after a connector unit is installed, the strips will resiliently bear or yieldingly press toward the conductors of the adjacent conductor units.

In order to prevent grounding, we prefer to equip the rear end of the connector unit 25a with a cover plate 49 of insulating material, which plate will be more fully described in connection with a description of Fig. 14.

Where one conductor unit is horizontally disposed and another vertically disposed, we employ a connecting unit of exactly the same construction as shown in Figs. 5, 6 and 7, with the exception that the insulating block 50 and the conductor strips 51, 52 and 53 are of angular shape, as shown in Fig. 11. Obviously a similar construction can be employed for each corner connector unit 29 (Fig. 1), and if desired, any of these corner or angular connector units may have a hole 54 to receive a fastening means which will act in conjunction with the spring latches 44 to secure the connector unit in position.

For taking current off of the conductor units, we may employ various forms of plugs. For example, the plug 31 shown in detail in Figs. 3 and 4, may consist of a single piece of insulation having a portion 55 to enter the conductor tube and a handle portion 56 which may be used by the operator in shifting the plug along the conductor unit. The inner portion of the plug can be provided with a pair of conductor strips 57 and 58 like those shown in Fig. 6 and the conductor strip 57 will resiliently press on the conductor 23 while the strip 58 will similarly press on either one of the conductors 22 or 24, depending on which face of the plug is turned uppermost.

Between the outer and inner portions of the plug there is a neck 59 to slide in the slot 21, and shoulders 60 at the inner portion of the neck abut against the rear surface of the front wall of the tube under the influence of the pressure exerted by the resilient strip 57.

An aperture 61 in the handle portion of the plug accommodates the wires 62 and these wires may be detachably connected by any suitable means such as screw 63 to extensions 64 and 65 of the conductor strip.

In Figs. 8 to 10 inclusive we have shown a jack plug adaptor which may be used in place of the collector plug 31. This adaptor also comprises an inner portion 66 and a handle portion 67 through which extend suitable holes 68 to receive conducting elements and to permit the insertion of the prongs of one of the jack plugs. Here also conductor strips 69 and 70 like those shown in Fig. 6 are mounted in recesses in the bottom and adjacent side respectively of the inner portion of the plug, and the strip 70 cooperates with the strip 23 of any one of the conductor units while the strip 69 engages one or the other of the conductors 22, 24, depending on which side of the plug is uppermost. At this point it might be noted that the adaptor plug 71 shown in Fig. 5 may be of the same construction as the one shown in Figs. 8, 9 and 10 but the external or handle portion of the two plugs is of different shapes.

Figure 14:
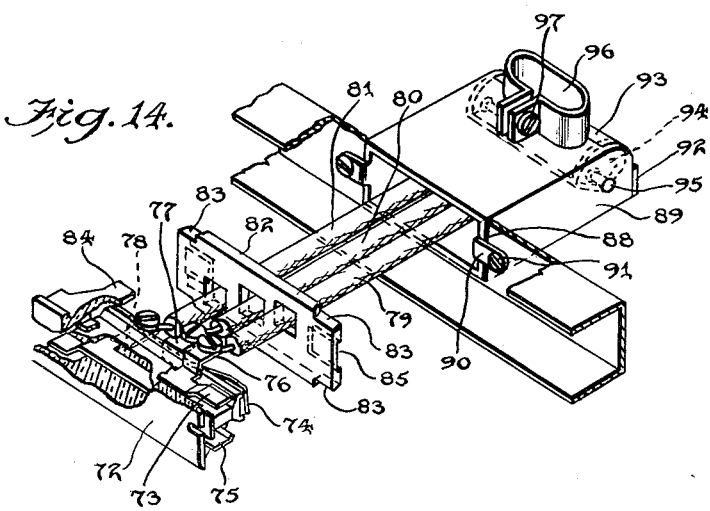
Fig. 14 is a fragmentary perspective view, partly broken away and showing an outlet box and special means for connecting the same to the source of electric current as well as to the conduit system.

In Fig. 14 we have shown a connector unit which may be employed to lead current from line wires to adjacent conductor units. For example, the connector unit 72 may be exactly the same with one exception to the connector unit shown in Figs. 5, 6 and 7 and it may occupy a position similar to that of the connector unit illustrated in the last mentioned figures. The exception mentioned resides in providing the conductor strips 73, 74 and 75, each with an integral ear numbered respectively 76, 77 and 78, which in turn are connected by screws or the like to insulated line wires 79, 80 and 81. In this case, the plate 82 heretofore mentioned as corresponding with the plate 49 in Fig. 5 is provided with apertures to receive the wires and its corners are notched as at 83 to receive the lugs 84 which project from the block of insulation and correspond with the lugs 42 in Fig. 7. If this form of connector is employed with a junction box, its ends may be recessed as shown at 85 to accommodate the usual lugs on the box.

As shown in Figs. 13 and 14, our system may be employed with wood molding 86 having a channel cut therein to receive the metal channel 87 which accommodates the insulated tube of the conducting unit. Where a junction box is to be employed with the metal channel, the bottom of the channel can be apertured as shown at 88 to receive the box 89 having apertured ears 90 which are secured in place by screws 91 and are accommodated by the recesses 85 of the cover plate 82.

As our system is of condensed form in order that it may occupy a minimum amount of space, we have devised a special form of junction box to receive the wires 79, 80 and 81. From Fig. 14, it will be noted that the rear end of the box has its lower half closed by a flat plate 92 while its upper half is closed by a semi-circular plate 93 that has ears 94 at its ends which are secured by swivel connections 95 to the opposite sides of the box. A clamping ring 96 forms part of the swiveled plate 93 and it may be clamped to a conventional metal cable by means of a bolt or screw 97. With this construction it will be understood that the axis of the ring 96 can be placed in alignment with the tubular portion of the box while wires are being installed and afterwards the ring can be moved into upright position to accommodate a conducting cable in a partition or within a wall.

In the preferred forms of our invention, each conductor unit has three conductors 22, 23 and 24 as is shown in some of the figures. Each conductor may be of trapezoid cross section with its edges embedded within the insulation which forms the tube 20. The collector plug, Figs. 3 and 4, or the adaptor plug, Figs. 8, 9, and 10, on the other hand has only two spring contact blades or strips. This permits the system to accommodate the customary three wire arrangement of 110-220 volts, and as the central conductor is neutral, three circuits are provided. The arrangement of three wire two circuits 110 volts also permits the convenience of switches; preferably the switch for the upper circuit and leaving the lower circuit on direct. In the two 110 volts circuits from either side of the neutral line, one of these circuits is contacted by using the two blade contact adaptor or collector plug with the bottom and side contacts. The adaptor or plug can be provided with any suitable means such as ornamental or knurled surfaces to indicate by sight or touch which circuit is being used. As the central line is neutral the polarity indication is automatic, and therefore we have polarity collector and adaptor plugs. One circuit of 220 volts is made by using the collector plug or adaptor plug with two spring blade contacts and no outer contact. These plugs are polarity collector and adaptor plugs.

One three wire circuit is indicated by using a three contact collector plug or adaptor plug, with two spring blade collector contacts on each of two sides and one spring blade collector contact on the bottom. These plugs are polarity collector and adaptor plugs, and the various arrangements of blades may be readily understood when one takes into consideration the blade arrangement of the connector unit shown in Fig. 6 in addition to the blade arrangements shown in Figs. 3, 4, 8, 9 and 10.

The reason we do not use a three contact collector plug for all results above outlined and connect the cord to contacts for the voltage wanted is that inexperienced persons may connect the cord to the system in an erroneous way. For example, he might connect to the 220 volt circuit, with consequent damage to an appliance.

The invention may have numerous and sundry applications. For instance, in show case or window lighting, the outer end of the collector or adaptor plug could terminate in a lamp socket for the connection of a lamp and reflector. For lighting, as over a work-bench or desk, if suspended from the ceiling or extended from a side wall, the conduit system should have an outer jacket or channel like that shown at 87 in Fig. 13. Obviously the invention may be readily adapted to low tension service such as telephone, etc.

Figure 15:
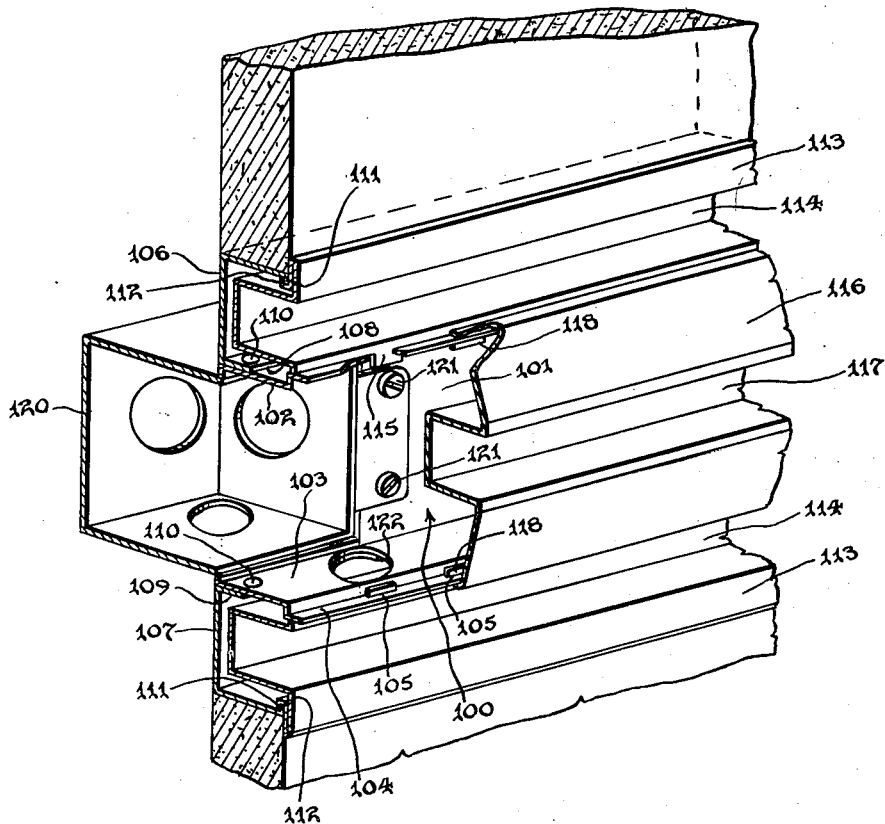
Fig. 15 is a partly perspective and partly sectional view of a concealed channel wire race way designed to accommodate the conduit system hereinbefore mentioned and designed for panel, trim or wainscot.
Figure 17:
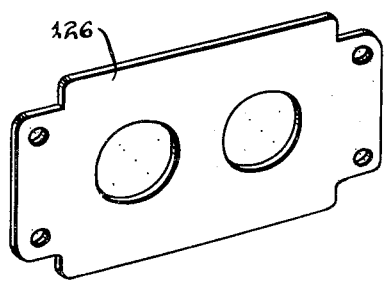
Fig. 17 is a perspective view of an apertured plate which may be used with such race way where a heavier conduit box might be inadvisable or prohibited.
Figure 16:
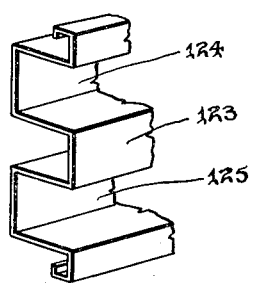
Fig. 16 is a fragmentary perspective view of a double channel confronting plate which may be substituted for the single channel plate shown in Fig. 15.
Figure 18:
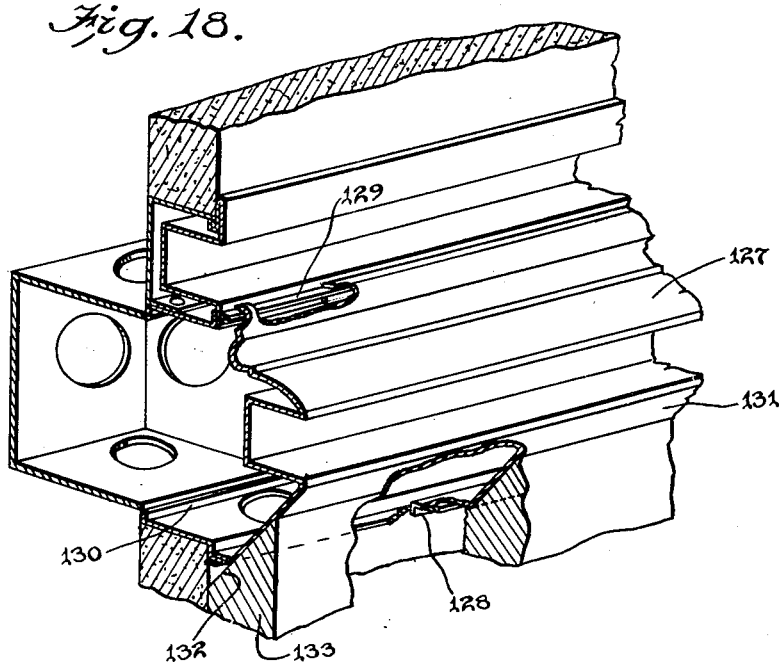
Figs. 18 and 19 are views similar to Fig. 15 but but showing race ways designed for baseboards or trim.
Figure 19:
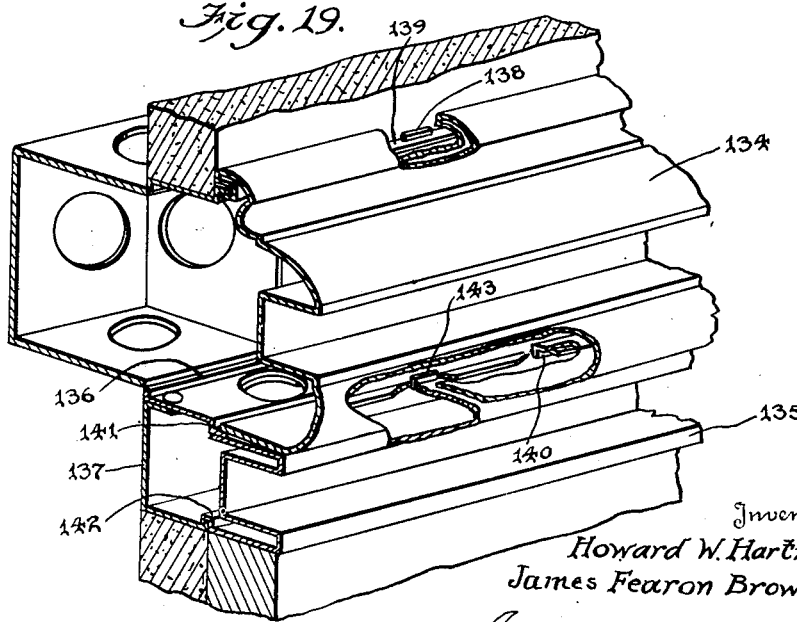

In the concealed channel wire race ways with flush and surface confronting plates (Figs. 15 to 19 inclusive) designed to accommodate the conduit system hereinbefore described, the structure in Figs. 15 and 16, as heretofore mentioned, has been designed for panel, trim or wainscot, while the ones shown in Figs. 18 and 19 will accommodate baseboard or trim as shown. The advantages of these arrangements will be readily appreciated as the combinations shown are readily built from standardized channel irons, the differences residing mainly in the configuration of the confronting plates.

In Fig. 15 the main or intermediate channel 100 has a rear web 101, a top leg 102 and a bottom leg 103, and each leg terminates in an L-shaped flange 104 which is apertured at spaced points 105 for a purpose hereinafter described.

Arranged above and below the intermediate channel are upper and lower channels respectively numbered 106 and 107. These channels are identical in construction but the upper one has its short leg 108 at the bottom while the lower one has its short leg 109 uppermost. These short legs are secured to the legs of the channel 100 by any suitable means such as rivets 110. The long leg of the channels 106 and 107 terminates in flanges 111 designed to interlock with hook shaped extremities 112 at one edge of flush confronting plates 113. Each of these plates may have a channel 114 to receive a conductor element 20 of the type shown in Figs. 2, 3 and 12, and connector units of the type shown in Figs. 6 and 14. Each confronting plate 113 has spaced lugs 115 at its opposite extremity to snap into the apertures 105 under the influence of the resiliency of the metal of which the plate 113 is formed.

Another confronting plate 116 is designed to close the mouth of the intermediate channel and this plate may also be provided with a channel 117 to accommodate our conductor system. The opposite edges of the plate 116 has spaced lugs 118 designed to snap into some of the apertures 105 of the flanges 104 of the intermediate channel for the purpose of detachably locking the plate 116 in position. Obviously the various channels in the rear of the confronting plates can accommodate conductor cables and insulated wires, and by arranging an aperture in the web 101 of the main channel, a conventional outlet box 120 may be connected to the main channel by means of screws 121 or the like. Holes 122 provided at intervals in both legs of the channel 100 permit tapping the running wires in the channels 106, 107 adjacent to the central channel.

In Fig. 16 we have illustrated a confronting plate 123 which may be used in place of the plate 116. In this instance the confronting plate has two channels 124 and 125 instead of the single channel 117 shown in Fig. 15.

An apertured plate 126 (Fig. 17) may be used in place of an outlet box where such box might be inadvisable or prohibitive.

In Fig. 18 the structure is similar to that of Fig. 15 with the exception that the lower channel 107 and its confronting plate 113 are omitted and a special type of confronting plate 127 for the central channel is used in place of the plate 126. However, the plate 127 is secured in position in the same manner as the plate 116, that is, it has spaced lugs 128 to enter the apertures of the L-shaped flanges 129 at the edges of the legs of the main channel 130, and the lower portion 131 of the confronting plate may be inclined downwardly and inwardly so as to snugly engage the inclined surface 132 of a baseboard 133 or the like.

The structure shown in Fig. 19 is also similar to that of Fig. 15 with the exception that the upper channel 106 and its confronting plate 113 are omitted, and special confronting plates 134 and 135 are provided for the central channel 136 and the lower channel 137. In this instance the upper edge portion of the plate 134 has upwardly extending lugs 138 to interlock with the apertures in the upper edge 139 of the main channel, and the lower edge portion of this plate has downwardly extending lugs 140 to interlock with the apertures in the lower edge 141 of the main channel.

The plate 135 in this embodiment has a hook-shaped part 142 at its lower edge to hook over the flange of the lower channel and its upper edge has lugs 143 to enter the apertures in the flange 141 of the main channel.

When the race way system is originally installed, or at any future time, circuits may be run in the race ways and used to feed electric outlets, such as side brackets, switches, ceiling lights, etc. and fished in the walls and partitions by concealed methods. In the concealed channel race ways as described, the cover can be blank over space that may or may not have the conductor channel, and which perhaps is not being used for the conductor system. In metal race ways the rear channel may be grounded in the field, and the confronting plate forming a continuous surface is automatically grounded. Blank cover pieces can be used to cover the face of the race ways when partitions are to be set at right angles to walls, such as when changing office partitions to suit different tenants. Obviously in the race way system the confronting plate may be furnished to conform to any scheme of interior decoration. In the raceways the space that the conduit system does not occupy, can be used and also sectionalized for different carrying systems.

Apertures may be used in the confronting plate at any desired point which the system may require.

While we have disclosed what we now consider to be some preferred embodiment of the invention we are aware that changes may be made in the details disclosed without departing from the spirit of the invention as expressed in the claims.

What we claim and desire to secure by Letters Patent is:

1. In an electrical conduit system, a plurality of conductor units arranged end to end and having their adjacent ends spaced from one another, each unit comprising a slotted tube of insulating material provided with internal conductors, a channel having a groove in which the conductor units are arranged, and a connecting unit positioned in the groove between adjacent ends of said tubes and including a member formed of insulating material and carrying conductor shoes which bridge the gaps between and contact with like conductors of the adjacent tubes, the ends of the connecting unit abutting adjacent ends of the conductor unit to prevent endwise movement of the connecting unit.

2. In an electrical conduit system, a plurality of conductor units arranged end to end and having their adjacent ends spaced from one another, each unit comprising a slotted tube of insulating material provided with internal conductors, a channel having a groove in which the conductor units are arranged, and a connecting unit positioned in the groove entirely between adjacent ends of said tubes and including a member formed of insulating material and carrying conductor shoes which bridge the gaps between and contact with like conductors of the adjacent tubes, each shoe being formed of resilient material and yieldingly engaging the conductors with which it cooperates, and resilient means for latching the connector unit to the tubes of adjacent conductor units.

3. An electrical conduit system comprising a plurality of conducting units arranged end to end and having their adjacent ends spaced from one another, each unit consisting of a slotted tube having internal conductors which project from the ends of the tube, adjacent ends of the tubes being spaced apart and notched, and a connecting unit positioned in its entirety between the adjacent ends of said tubes and filling the space between adjacent conducting units, said connecting unit including a member of insulating material having ends conforming to the shape of the ends of the tubes and snugly engaging the latter, and conductor shoes secured to said member, bridging the gaps between the conductors of adjacent tubes and resiliently engaging said conductors.

4. An electrical conduit system comprising a plurality of conducting units arranged end to end and having their adjacent ends spaced from one another, each unit consisting of a slotted tube having internal conductors which project from the ends of the tube, adjacent ends of the tubes being spaced apart and crooked shaped, and a connecting unit positioned between the adjacent ends of said tubes and filling the space between adjacent conducting units, said connecting unit including a member of insulating material having ends conforming to the shape of the ends of the tubes and snugly engaging the latter, and conductor shoes secured to said member, bridging the gaps between the conductors of adjacent tubes and resiliently engaging said conductors, and spring latches secured to the ends of said member and abutting against the inner surfaces of the slotted walls of the tube for securing the connector unit in position.

5. An electrical conduit system comprising a plurality of conducting units arranged end to end and having their adjacent ends spaced from one another, each unit consisting of a slotted tube having internal conductors which project from the ends of the tube, adjacent ends of the tubes being spaced apart and crooked shaped, and a connecting unit positioned between the adjacent ends of said tubes and filling the space between adjacent conducting units, said connecting unit including a member of insulating material having ends conforming to the shape of the ends of the tubes and snugly engaging the latter, and conductor shoes secured to said member, bridging the gaps between the conductors of adjacent tubes and resiliently engaging said conductors, each of said conductor shoes being of substantially V-shape.

6. An electrical conduit system comprising a plurality of conducting units arranged end to end and having their adjacent ends spaced from one another, each unit consisting of a slotted tube having internal conductors which project from the ends of the tube, adjacent ends of the tubes being spaced apart and crooked shaped, and a connecting unit positioned between the adjacent ends of said tubes and filling the space between adjacent conducting units, said connecting unit including a member of insulating material having ends conforming to the shape of the ends of the tubes and snugly engaging the latter, and conductor shoes secured to said member, bridging the gaps between the conductors of adjacent tubes and resiliently engaging said conductors, and a plate of insulating material closing the rear end of said member and having portions which overlap and snugly engage rear portions of said member.

7. An electrical conduit system comprising a plurality of conducting units arranged end to end and having their adjacent ends spaced from one another, each unit consisting of a slotted tube having internal conductors which project from the ends of the tube, adjacent ends of the tubes being spaced apart and crooked shaped, and a connecting unit positioned between the adjacent ends of said tubes and filling the space between adjacent conducting units, said connecting unit including a member of insulating material having ends conforming to the shape of the ends of the tubes and snugly engaging the latter, and conductor shoes secured to said member, bridging the gaps between the conductors of adjacent tubes and resiliently engaging said conductors, each of said shoes having a projecting ear for the attachment of an electric wire to the same.

8. An electrical conduit system comprising a plurality of conductor units arranged in spaced relation end to end, each unit consisting of a slotted tube of insulating material having internal conductors which project from adjacent ends of the tubes, the adjacent ends of the tubes being notched, and a connecting unit positioned between the adjacent ends of the tubes and having projecting portions engaging said notches, conductor shoes secured to the connector unit and bridging the gaps between the conductors of the tubes, the adjacent ends of the tubes being provided with internal shoulders, and resilient latches positioned at the ends of the connector unit and engaging said shoulders for detachably securing the connector unit to the conductor units.

9. In an electrical conduit system comprising a conduit unit consisting of a slotted tube of insulating material having internal conductors provided with substantially flat surfaces, a plug extending through said slot and having resilient conducting shoes slidably engaging said faces of said conductors, each shoe being of leaf form and of substantially U-shape and having substantially flat surfaces at its ends yieldingly engaging one of said faces of one of said conductors at a plurality of spaced points.

HOWARD W. HARTMAN.
JAMES FEARON BROWN.